United States Patent [19]

Perricone et al.

[11] Patent Number: 4,830,765

[45] Date of Patent: May 16, 1989

[54] MODIFIED NON-POLLUTING LIQUID PHASE SHALE SWELLING INHIBITION DRILLING FLUID AND METHOD OF USING SAME

[75] Inventors: Alphonse C. Perricone; Dennis K. Clapper; Dorothy P. Enright, all of Houston, Tex.

[73] Assignee: Baker Hughes Incorporated, Houston, Tex.

[21] Appl. No.: 128,798

[22] Filed: Dec. 4, 1987

[51] Int. Cl.$^4$ ................................................ C09K 7/02
[52] U.S. Cl. ................... 252/8.51; 252/8.514; 252/49.3
[58] Field of Search .................. 252/8.51, 8.514, 49.3

[56] References Cited

U.S. PATENT DOCUMENTS

| | | |
|---|---|---|
| 2,191,312 | 2/1940 | Cannon ........................ 252/8.51 |
| 2,589,949 | 3/1952 | Meadors ........................ 252/8.51 |
| 2,624,708 | 1/1953 | Langer et al. ................ 252/49.3 X |
| 2,698,833 | 1/1955 | Wilson . |
| 2,825,693 | 3/1958 | Beaubien et al. ............ 252/49.3 X |
| 3,000,826 | 9/1961 | Gililland ........................ 252/49.3 |
| 3,049,490 | 8/1962 | Donham ........................ 252/8.51 |
| 3,210,274 | 10/1965 | Caruso . |
| 3,277,971 | 10/1966 | Dawson . |
| 3,379,650 | 4/1968 | Beasley et al. . |
| 3,525,688 | 8/1970 | Swanson . |
| 3,660,183 | 5/1972 | Knowles et al. . |
| 3,979,304 | 9/1976 | Fischer et al. . |
| 3,980,571 | 9/1976 | Marx ........................... 252/49.3 X |
| 4,064,055 | 12/1977 | Carney . |
| 4,172,800 | 10/1979 | Walker . |
| 4,409,108 | 10/1983 | Carney et al. . |
| 4,425,241 | 1/1984 | Swanson . |
| 4,494,610 | 1/1985 | Walker . |
| 4,498,994 | 2/1985 | Heilweil . |
| 4,528,104 | 7/1985 | House et al. . |
| 4,614,235 | 9/1986 | Keener et al. . |
| 4,615,813 | 10/1986 | Bretz . |
| 4,618,434 | 10/1986 | Blouin . |
| 4,622,153 | 11/1986 | Watson et al. . |
| 4,719,021 | 1/1988 | Branch ........................ 252/8.514 |

OTHER PUBLICATIONS

Gray et al, *Composition and Properties of Oil Well Drilling Fluids*, Fourth Ed., Pub. Feb. 1980, pp. 394–400.

Primary Examiner—Herbert B. Guynn
Attorney, Agent, or Firm—Hubbard, Thurman, Turner & Tucker

[57] ABSTRACT

The present invention provides a modified liquid phase drilling fluid having desirable properties of shale swelling inhibition, lubrication, and high temperature performance. The fluid is comprised of the following: (1) a liquid phase containing: (a) a water phase comprising fresh water, seawater, brine, simulated brine, or mixtures thereof; and (b) a water-soluble component selected from the class consisting of polyhydric alcohols, glycol, glycol ethers, polypropylene glycols, polyethylene glycols, ethylene oxide-propylene oxide copolymers ("EO-PO"), alcohol-initiated EO-PO copolymers and/or mixtures thereof, the ratio of said water-soluble component in the total liquid phase being from about 5% to about 50% by volume; (2) a viscosifier for suspension of solids in said liquid phase; and (3) a filtration control agent.

1 Claim, No Drawings

4,830,765

MODIFIED NON-POLLUTING LIQUID PHASE SHALE SWELLING INHIBITION DRILLING FLUID AND METHOD OF USING SAME

BACKGROUND OF THE INVENTION

1. Field of the Invention

The invention relates to drilling fluids used in the drilling of subterranean oil and gas wells. In particular, the invention provides a water-soluble synthetic component which provides lubricity and shale inhibiting properties comparable to those of an oil-based drilling fluid without the adverse effects thereof.

2. Brief Description of the Prior Art

A rotary system is the most common form of drilling a subterranean well. This system depends upon the rotation of a column of drill pipe to the bottom of which is attached a multi-pronged drilling bit. The drill bit cuts into the earth, causing the cuttings to accumulate as drilling continues. As a result, a drilling fluid must be used to carry these cuttings to the surface for removal, thus allowing the bit to continue functioning, and the bottom of the hole to be kept clean and free of cuttings at all times Although aqueous-based drilling fluids which utilize clear water, brine, or sea water as the primary liquid phase may be found to be dominant within some facets of the drilling industry, drilling fluids have been developed and commercialized utilizing a hydrocarbon liquid as the major liquid constituent. The use of such a hydrocarbon based fluid or water-in-oil emulsion fluid is quite common in which the drilling fluid is utilized in the higher temperature wells which are drilled to the more substantial depths. These hydrocarbon fluids are referred to as oil based fluids and normally exhibit very desirable fluid flow characteristics within their respective temperature utilization ranges. Additionally, such fluids are recognized as having enhanced lubricity characteristics, for the purpose of lubricating the drilling bit and preventing differential sticking of the drill pipe. In addition, some of such fluids have exhibited considerable beneficial shale stabilization properties to prevent erosion of shale or clayey substances in the well which soften on hydration when exposed to an aqueous fluid formulation. Such hydrocarbon based fluids are known also to exhibit excellent filtration properties by incorporation of a filtration control agent into the composition to inhibit filtrate loss to the formation around the bore hole.

While such hydrocarbon based fluids have been widely accepted in the industry and have considerable advantages, such fluids also have disadvantages, including environmental pollution effects resulting from, for example, the hydrocarbon fluid being accidentally discharged into the sea or ocean when used on offshore wells. There is also some difficulty in preparation at offshore locations where the barging of considerable quantities of hydrocarbon based fluids is cumbersome and comparatively expensive. Currently all oil-based fluids used offsore U.S.A. and cuttings contaminated with oil-base fluid must be contained and hauled back to shore. This is, obviously, an expensive operation.

Shale stabilization in a fluid suspension is believed to at least partially be dependent upon inhibition of swelling and dispersion of the shale into the fluid. By "shales" and "shale" is meant to refer to materials such as bentonite and the like, claystones and "gumbo"-type colloidal-clay substances and related substances which possess the property of hydrody namic volume increase when exposed to aqueous environments. Of particular importance is the recent geological sediment referred to as "gumbo" encountered in the drilling of some subterranean wells. This "gumbo" contains a high percentage of smectite, hydrates in water rather rapidly, becomes soft and deformable, and may swell to many times its original size. By "swelling" we mean to refer to the hydrodynamic volume increase of the shale. By "inhibit", "inhibition" and "inhibition of swelling" we mean the ability of a process to retard the hydration of shales whereby they remain intact and basically in their original size, shape and volume, said process being the preparation of an inhibitive fluid suspension and introducing the drill cuttings generated by the drill bit into the drilling fluid suspension as it is circulated through and out of the well.

Swelling of shales is believed to be attributable to at least two mechanisms: crystalline and osmotic. Crystalline swelling also known as surface hydration results from the adsorption of mono-molecular layers of water onto the shale surfaces. Shales usually contain a mineral component which has an expandable layer-type structure which allows water to be adsorbed on these interlayer surfaces thus causing additional swelling of the shale. Osmotic swelling occurs if the cation concentration on the surfaces of the shale is greater than that in the surrounding fluid. This difference draws the water phase between the layers whereby ion hydration and water adsorption occurs causing an increase in the hydrodynamic volume.

For swelling to occur by either of the aforementioned processes, the shale must interact with the water taking and/or sharing hydroxyl groups of the water with it. In present drilling operations, shale inhibition is achieved by addition of divalent cations or potassium ions through base exchange or by the addition of encapsulating and bridging polymers to the water-based fluids or, by the use of water-in-oil emulsion fluids (oil based fluids).

We have discovered a drilling fluid which provides beneficial shale and borehole stabilization without the addition of salts and/or polymers or the use of the water-in-oil emulsion fluids. With this fluid, the reactivity of the shale is partially satisfied by a hydroxyl-bearing water-soluble synthetic component in the fluid phase. The preferential adsorption of these water-soluble additives fulfills the surface reactivity requirements of the shale without the formation of bonds between particles and reduces the adsorption of the multi-layers of water which can cause swelling.

The fluid is comprised of the following: (1) a liquid phase containing (a) a water phase comprising fresh water, seawater, brine, simulated brine, or mixtures thereof; and (b) a water-soluble component selected from the class consisting of polyhydric alcohols, glycol, glycol ethers, polypropylene glycols, polyethylene glycols, ethylene oxide-propylene oxide copolymers ("EO-PO"), alcohol-initiated EO-PO copolymers and/or mixtures thereof, the ratio of said water-soluble component in the total liquid phase being from about 5% to about 50% by volume; (2) a viscosifier for suspension of solids in said aqueous phase; and (3) a filtration control agent. The fluid with the water soluble component will exhibit a lubricity coefficient lower than that for substantially the same fluid without the water soluble component as determined by the American Petroleum Institute's "Procedure for Determination of Lubricity Coefficient (Tentative)" (1980), and the linear swelling on a reconstituted "gumbo" shale inserted for about 60 minutes in said drilling fluid being lower than that for substantially the same fluid without the water soluble component, as measured by the "Swelling Test", "Rigsite Shale Evaluation Techniques for Control of Shale-related Wellbore Instability Problems", SPE/IADC Paper No. 16054, pages 52–53, (1987).

While particular water soluble synthetic additives have been used in the petroleum industry in the past, their use as a fluid phase component which enhances the lubricating and shale inhibiting characteristics of a drilling fluid has not been appreciated by those skilled in the art. Typical of such prior art is U.S. Pat. No. 4,498,994, which teaches the use of several polyhydric alcohols or other materials as a solvent for salt, such as calcium bromide brine, in a solids free completion fluid and method. Chemicals such as polypropylene glycols are used as industrial lubricants and hydraulic fluids in other industries.

The present invention comprises a drilling fluid having a liquid phase which imparts lubricity and shale swelling inhibition properties to the fluid similar to the beneficial properties of oil-based drilling fluids without the accompanying adverse effects, such as high toxicity and the like.

SUMMARY OF THE INVENTION

The present invention provides a two component liquid phase water based drilling fluid comprising: (1) a liquid phase containing (a) a water phase comprising fresh water, seawater, brine, simulated brine, or mixtures thereof; and (b) a water-soluble alcohols, glycol, glycol ethers, polypropylene glycols, polyethylene glycols, ethylene oxide-propylene oxide copolymers, alcohol-initiated EO-PO copolymers and/or mixtures thereof, the ratio of said water-soluble component in the total liquid phase being from about 5% to about 50% by volume; (2) a viscosifier for suspension of solids in said aqueous phase; and (3) a filtration control agent. The fluid with the water soluble component will exhibit a lubricity coefficient lower than that for substantially the same fluid without the water soluble component as determined by the American Petroleum Institute's "Procedure for Determination of Lubricity Coefficient (Tentative)" (1980), and the linear swelling on a reconstituted "gumbo" shale inserted for about 60 minutes in said drilling fluid being lower than that for substantially the same fluid without the water soluble component, as measured by the "Swelling Test", "Rigsite Shale Evaluation Techniques for Control of Shale-related Wellbore Instability Problems", SPE/IADC Paper No. 16054, pages 52–53, (1987).

DESCRIPTION OF THE PREFERRED EMBODIMENTS

The present invention comprises a two component liquid phase drilling fluid and method of using same wherein beneficial physical properties of a hydrocarbon based drilling fluid are provided without the accompanying adverse effects, such as high toxicity and the like.

The drilling fluid of the present invention incorporates a synthetic water-soluble component into the liquid phase. Said component may be selected from a class of polyhydric alcohols, glycols, glycol ethers, polypropylene glycols, polyethylene glycols, EO-PO copolymers, alcohol initiated EO-PO copolymers and/or mixtures thereof, in a percentage from between about 5% by volume to about 50% by volume based upon the liquid phase of the drilling fluid.

The modified liquid phase drilling fluid may comprise fresh or tap water or brines. In the case of waters containing mono and polyvalent salt ions, the drilling fluid system incorporating the present invention should not be salt sensitive.

The drilling fluid system of the present invention may contain known clayey constituents forming a colloidal solids phase, such as attapulgite, sepiolite, bentonite or other compositions of clays and minerals. Typically, the drilling fluid composition of the present invention will incorporate from between about 0.0% by volume and about 5.0% by volume of solids particulate matter hereinafter referred to as "clayey based".

Any known deflocculant may be utilized in the drilling fluid composition of the present invention such as lignin derivatives, lignite-containing materials, acrylic-derived polymers and copolymers, and the like. Sodium/chrome lignosulfonates are preferably incorporated. Such a product is available under the trademark UNI-CAL ®, trademark of and marketed by Milpark Drilling Fluids of Houston, Tex. Typically, such material may be present in the total drilling fluid composition in an amount of from between about 0.5 pounds per U.S. 42 gallon barrel and about 15 pounds per U.S. 42 gallon barrel.

The drilling fluid may also contain well known weighting agents, such as barite or hematite, in any preferred amount up to a mud weight of about 18 pounds per gallon.

Chemicals for use as filtration control additives which are well known to those skilled in the art may be added also to the drilling fluid composition of the present invention to lower filtration rate, although it has been found that the drilling fluid composition of the present invention itself will provide some benefit as a filtration rate control material without the presence of other additives for that purpose.

Of the synthetic water soluble components defined above, tripropylene glycol bottoms are preferred in an amount of about 30% by volume of the liquid phase of the drilling fluid composition. Tripropylene glycol bottoms is readily available from many chemical manufacturers. Compositions of these bottoms may vary from manufacturer to manufacturer, but typical of one such bottoms is the following composition: 5–20% by volume tripropylene glycol, the remainder being polypropylene glycol highers.

The two component modified liquid phase drilling fluid of the present invention has been found to have excellent lubricity characteristics. For purposes of determining lubricity, we have utilized in our testing the "Procedure for Determination of Lubricity Coefficient" (Tentative), a standardized testing procedure published by the American Petroleum Institute, (1980) as follows:

1. Calibration of Instrument a. Prepare a calibration curve for conversion of ammeter reading to lubricity coefficient by using a Prony brake and procedure provided with the instrument.

b. Recalibrate if the drive motor is altered or replaced.

2. Standardization of Test Ring and Block a. Wash the test ring and block with water and a household cleanser. Rinse thoroughly with water.

b. Place the test ring on the tapered shoulder at the bottom of the shaft and secure with the lock nut.

c. Place the test block in the holder, concave side face out, and align with the test ring d. Fill the sample container with water (approximately 300 cm$^3$) and position it so that the test surfaces are covered.

e. Attach a rheostat in series with the instrument and turn on the drive motor. Adjust the rheostat until the tachometer on the drive shaft reads 60 rpm.

f. Apply 150 in.-lb load with the torque arm. Maintain speed at 60 rpm.

g. Observe meter reading in amperes and refer to the calibration chart for the lubricity coefficient. Run for several minutes or until the reading stabilizes. The lubricity coefficient for water should be between 0.33 and 0.36. If it is not in this range, the ring and block surfaces should be reconditioned using one of the following methods:

(1) Continue to operate the instrument at a constant load of 150 in.-lb with water in contact with the test surfaces. The ammeter reading should slowly approach the test range of 33 to 36 and then remain steady.

(2) Operate the instrument using a slurry of about 25 lb per bbl of bentonite in fresh water and a load of 150 in.-lb. Repeat step (1).

(3) Place a grinding compound on the contact surfaces and operate the instrument at a load of 150 in.-lb. Repeat set (1).

3. Determination of Mud Lubricity Coefficient a. Assemble the instrument and standardize the test ring and block to give a 0.33 to 0.36 lubricity coefficient for water.

b. Stir the mud sample ten minutes on a Multimixer prior to testing.

c. Place the mud sample in the container and position to cover the ring and block.

d. Start the motor and adjust the rheostat to give 60 rpm with a load of 150 in.-lb.

e. Operate the instrument until the ammeter reading stabilizes.

f. Use the calibration curve to convert the ammeter reading to lubricity coefficient.

Shale swelling inhibition may be measured utilizing the procedure identified on pages 52–53, "Swelling Test" of paper entitled "Rigsite Shale Evaluation Techniques for Control of Shale-related Wellbore Instability Problems", SPE/IADC Paper No. 16054 (1987). In addition, a penetrometer may be used to determine the hardness (or lack thereof) of a shale sample exposed to a fluid. In this test, the depth that a needle bearing a known load penetrates the specimen is measured. The depth of penetration decreases as the swelling of the shale is decreased and may be referred to as "relative hardness".

EXAMPLE I

Tests were performed and results were evaluated in order to determine the fluid flow characteristics, lubricity parameters and shale stabilization properties of the two component modified liquid phase drilling fluid of the present invention. A base system containing only fresh water and 12 pounds per barrel of pre-hydrated bentonite was prepared and compared to three suspensions containing 12 pounds per barrel of a prehydrated bentonite and fresh water which contained 10, 20 and 40 % by volume, respectively, of neutralized tripropylene glycol bottoms (TPGB). Rheological properties were taken after "hot rolling" at 150° F. for 16 hours. Plastic viscosity, yield point, initial gel and 10 minute gel readings were determined using standard API testing procedures. To one of the samples (Sample "C"), was added 0.3 pounds per barrel of lignosulfonate deflocculant, in order to prepare the samples for evaluation. The results of this test, in Table 1, below, show that preparation of the two component modified liquid phase drilling fluid of the present composition incorporating a polypropylene glycol mixture will not adversely effect rheological properties when compared to a similar base fluid. All of the measurements set forth in Table 1 are within acceptable parameters.

TABLE 1

| Composition, lb/bbl* | Base | Sample No. A | B | C |
| --- | --- | --- | --- | --- |
| Bentonite | 12 | 12 | 12 | 12 |
| TPGB (neutralized) | 0 | 34.8 | 69.7 | 139.3 |
| (TPGB, % Vol of liquid phase) | 0 | 10 | 20 | 40 |
| Lignosulfonate deflocculant | — | — | — | 0.3 |
| pH | 8.6 | 8.4 | 8.3 | 8.4 |
| Rheology after hot rolling at 150° F. for 16 hours | | | | |
| PV, cPs | 4.5 | 12 | 18 | 17 |
| YP, lb/100 ft$^2$ | 3 | 8 | 15 | 27 |
| I Gel, lb/100 ft$^2$ | 2 | 6 | 10 | 4 |
| 10 Min Gel, lb/100 ft$^2$ | 5 | 11 | 18 | 9 |

*finished API barrel equivalent

EXAMPLE II

Tests were performed and results were evaluated on the fresh water two component modified liquid phase drilling fluid prepared as in Example I in order to determine the lubricity characteristics of such a fluid. Lubricity coefficient testing was performed according to the API specifications set forth above. The results of this test clearly show that the two component modified liquid phase drilling fluid of the present invention enables the drilling fluid to have increased lubricity characteristics as the concentration of polypropylene glycol mixture in the fluid phase is increased. Results of this test are set forth, below:

TABLE 2

| Polypropylene Glycol Mixture Concentration | Lubricity Coefficient |
| --- | --- |
| 0% | 0.45 |
| 10% | 0.29 |
| 20% | 0.14 |
| 40% | 0.08 |

EXAMPLE III

Tests were performed and results were evaluated in order to determine shale stabilization properties of the drilling fluid as prepared in Example I. A "shale" sample was prepared to simulate drilled cuttings and was placed into the two component modified liquid phase drilling fluid and hot rolled at 150° F. for approximately 3 hours. Thereafter, the samples were removed from the hot roll oven, allowed to cool, and the drilling fluid extracted. The amount of shale which was retained on a 30 mesh screen was determined by weighing said air dried shale. In this test, the more shale that is retained on the screen, the more effective is the drilling fluid composition in stabilizing the shale and preventing or abating its dispersion. For purposes of this test, wedges of the simulated shale were cut from a two inch diameter disc which was formed by pressing minus 10 mesh plus 20 mesh shale fragments at 7600 psi for 24 hours. In the table below, the percent retained on plus 30 mesh screen after hot rolling for 3 hours at 150° F. is shown. In this test, the results clearly indicate that the two component modified liquid phase drilling fluid of the present invention provides satisfactory shale stabilization and such shale stabilization properties are enhanced with increasing amounts of neutralized TPGB added in the preparation of the drilling fluid.

TABLE 3

| % (Volume) TPGB | Wt. % Shale Retained on 30 mesh screen |
|---|---|
| 0 | 4.3 |
| 10 | 18.8 |
| 20 | 10.0 |
| 40 | 50.4 |

EXAMPLE IV

Tests were performed and results were evaluated in order to determine the thermal stability of the properties of the two component modified liquid phase drilling fluid of the present invention. In this test, the polypropylene glycol mixture was TPGB and was added in an amount of 30% by volume of liquid phase. The water phase of the drilling fluid was 70% Houston, Tex. tap water. The drilling fluid also contained in an amount of pounds per barrel the following: (1) 10 ppb prehydrated bentonite; (2) 10 ppb formaldehyde-treated lignin/lignite filtration control additive; (3) 0.4 ppb lignosulfonate deflocculant; and (4) 100 ppb barite (weighting agent). Flow properties were determined before and after hot rolling the fluid at 300° F. for 16 hours. The rheological properties were measured at 120° F. As shown in Table 4, the properties of such a laboratory-prepared drilling fluid composition of the present invention exhibited satisfactory flow properties, after aging at a temperature of 300° F.

TABLE 4

| Flow Properties of Two-Component Modified Liquid Phase Drilling Fluid | | | | | | | | | |
|---|---|---|---|---|---|---|---|---|---|
| 600 | 300 | 200 | 100 | 6 | 3 | 1G | 10G | pH | PV/YP |
| Fann 35 Rheology, 120° F. Initial | | | | | | | | | |
| 100 | 55 | 39 | 23 | 4 | 3 | 4 | 45 | 10.2 | 45/10 |
| After hot rolling at 300° F. | | | | | | | | | |
| 84 | 50 | 38 | 25 | 9 | 9 | 9 | 44 | 8.0 | 34/16 |

EXAMPLE V

The laboratory sample of Example IV was utilized to demonstrate the filtration control effectiveness of the fluid. The filtration rates were determined on the aged fluid using standard API procedures with a resultant filtrate loss of only 5.2 cm³ in 30 minutes. A high temperature, high pressure filtration rate was measured while exposing the sample to a temperature of 300° F. and at a differential pressure of 500 psi. The resultant filtrate loss of such test was found to be 15 cm³ in 30 minutes.

EXAMPLE VI

The aged drilling fluid sample of Example IV was tested for lubricity characteristics, and was found to have a lubricity coefficient of 0.18, indicating that a weighted drilling fluid of the present invention which also contained a filtration control additive and barite still provided excellent lubricity characteristics.

EXAMPLE VII

The aged fluid of Example IV also was tested for shale stabilization characteristics. Eighty-one percent (81%) by weight of the shale particulate wedge prepared and tested as described in Example III was retained on a 30 mesh screen after hot rolling at 150° F. for three hours. Thus, this weighted, two component modified liquid phase drilling fluid has been found to exhibit satisfactory shale stabilization properties when weighted with conventional weighting agents, such as barite.

EXAMPLE VIII

Tests were performed and results were evaluated on a laboratory prepared two component modified liquid phase drilling fluid of the present invention incorporating sea water as the aqueous phase. A naturally occurring mineral viscosifier, sepiolite, was incorporated into a drilling fluid sample utilizing 30% by volume TPGB and 70% by volume sea water to form the aqueous phase. The sepiolite was added in an amount of 12 ppb, rheological properties and lubricity characteristics were measured utilizing the testing procedures described in earlier examples, above, indicating that the drilling fluid so prepared exhibited satisfactory fluid flow properties; and provided lubricity to the system. The results are set forth in the table below:

TABLE 8

| Properties of Two-Component Modified Liquid Phase Drilling Fluids | | | | | | | | | | |
|---|---|---|---|---|---|---|---|---|---|---|
| A. Flow Properties after hot rolling at 150° F., 16 hours Fann 35 Rheology, Room Temperature | | | | | | | | | | |
| % TPGB | 600 | 300 | 200 | 100 | 6 | 3 | 1G | 10G | pH | PV/YP |
| 0 | 24 | 21 | 20 | 18 | 12 | 11 | 12 | 18 | 7.5 | 3/18 |
| 30 | 23 | 16 | 13 | 10 | 5 | 5 | 6 | 7 | 9.1 | 7/9 |
| B. Lubiicity Coefficient | | | | | | | | | | |
| % TPGB | Lubricity Coefficient | | | | | | | | | |
| 0 | .46 | | | | | | | | | |
| 30 | .24 | | | | | | | | | |

EXAMPLE IX

Tests were performed and results were evaluated on an additional two component modified liquid phase drilling fluid incorporating seawater into the fluid phase. The drilling fluid was similar to that prepared and tested in Example VIII. In this test, a sample was prepared which contained the same ratio of polypropylene glycol mixture/seawater and sepiolite, as in Example VIII but varied with respect to the addition of a lignosulfonate deflocculant, barite, and a filtration control additive. In this test, MIL-PAC LV was utilized as a filtration control agent, and is a cellulose derivative. The composition, flow properties, lubricity characteristics and shale stabilization results are set forth in the following table:

TABLE 9
PROPERTIES OF SIMULATED DRILLING FLUID CONTAINING 30% TPGB - 70% SEAWATER AS THE LIQUID PHASE

| Composition, lb/bbl | |
|---|---|
| Sepiolite | 10 |
| MIL-PAC LV | 2 |
| MIL-REZ | 10 |
| UNI-CAL | 1 |
| Barite | 300 |
| Weight, lb/gal | 13.9 |

A. Flow Properties
Fann 35 Rheology, 120° F.

| 600 | 300 | 200 | 100 | 6 | 3 | 1G | 10G | pH | PV/YP |
|---|---|---|---|---|---|---|---|---|---|
| Initial | | | | | | | | | |
| 47 | 26 | 20 | 14 | 9 | 9 | 17 | 36 | 9.0 | 21/5 |
| After hot rolling at 300° F., 16 hours | | | | | | | | | |
| 46 | 24 | 18 | 13 | 7 | 7 | 11 | 19 | 8.6 | 22/2 |

| Filtrates, cc | API | HTHP (300° F., 500 psi) |
|---|---|---|
| | 10.2 | 16.8 |

B. Lubricity Coefficient: .09
C. Shale Stabilization: Wt. % retained on 30 mesh screen >95%

EXAMPLE X

Tests were run and rseults were evaluated to determine the ability of various test fluids to inhibit swelling of sodium bentonite samples. Listed below are the test fluids used in the swelling tests:

| SAMPLE | ADDITIVE |
|---|---|
| A,B,C | Deionized water (blank) |
| D | Propylene glycol (100%) |
| E | Tripropylene glycol (100%) |
| F | Diesel Oil (100%) |
| G | TPG bottoms (50%) |
| H,I | Glycerin (50%) |
| J,K | Glycerin (25%) |
| L,M,N | Propylene glycol (50%) |
| O,P,Q | Sorbitol (50%) |
| R | Alcohol initiated EO-PO copolymer* (50%) |
| S | EO-PO copolymer** (50%) |

*Poly-tergent S-305 LF - Olin Chemical Corporation
**Polyglycol 15-200 - Dow Chemical Company In the tests where more than one sample was prepared and tested (i.e., A,B,C; H,I; J,K; L,M,N; O,P,Q) linear swelling calculations were averaged to reflect the percentage increase in swelling, initially, and over a period of time, in comparison to the blank.

In order to determine the swelling characteristics of the fluid to the swelling inhibition characteristics of a hydrocarbon, diesel oil was tested for swelling characteristics, SAMPLE F.

For each test, a pellet was prepared by compacting approximately 5 grams of sodium bentonite with a moisture content of from between about 28 to about 32 percent by weight in a 0.5 in. diameter die under approximately 2500 lbs load (12,500 psi) for approximately 6 minutes. The length of each pellet was measured by micrometer, and each pellet was weighed. The density of the pellets varied from 1.78 to 1.82 g/cm³. Thereafter, each pellet was placed in a 3×5 inch plastic bag, and positioned in a digimatic swellmeter, which was utilized to determine swelling of a particulate sample. Thirty (30) ml of the fluid (or diesel, or blank) which was tested was placed in the bag. The amount of linear swelling was recorded versus time.

In addition to observing swelling rates of the samples in the various fluids in these tests, the condition of the bentonite pellet was also measured perpendicular to the length of the pellet cylinder with a penetrometer needle weighing 0.616 pounds and having a surface area of $1.20 \times 10^{-3}$ square inches. This combination of weight and surface area produced a force of 510 pounds per square inch at the surface of the particulate pellet. This penetration depth gives a measure of the relative hardness of the pellets.

In these tests on sodium bentonite pellets, a penetrometer reading of 12 or greater indicated that the pellet had lost practically all of its integrity; a penetrometer reading of 2 or less indicates that very little bentonite hydration occurred over the test period.

The results of this test are set forth in the table below:

TABLE 10
LINEAR SWELLING OF SODIUM BENTONITE IN DEIONIZED WATER

| | Percent Linear Swelling | | | |
|---|---|---|---|---|
| Time (min.) | A | B | C | Ave % |
| 5 | 0.22 | 0.16 | 0.22 | 0.20 |
| 10 | 0.50 | 0.46 | 0.99 | 0.48 |
| 15 | 0.77 | 0.76 | 0.77 | 0.77 |
| 30 | 1.41 | 1.59 | 1.61 | 1.54 |
| 60 | 2.38 | 2.62 | 2.89 | 2.63 |
| 120 | 3.58 | 3.37 | 4.11 | 3.69 |

TABLE 10A
LINEAR SWELLING AND RELATIVE HARDNESS OF SODIUM BENTONITE IN VARIOUS FLUIDS

| | Percent Linear Swelling | | | |
|---|---|---|---|---|
| Time (min.) | D | E | F | G |
| 5 | −0.13 | −0.19 | −0.02 | 0 |
| 10 | −0.17 | −0.23 | −0.04 | −0.01 |
| 15 | −0.19 | −0.26 | −0.04 | −0.01 |
| 30 | −0.28 | −0.36 | — | −0.01 |
| 60 | −0.35 | −0.58 | −0.04 | −0.02 |
| 120 | — | — | — | −0.14 |
| Hardness (mm) | — | — | 1.5 | 0 |

TABLE 10B
LINEAR SWELLING OF SODIUM BENTONITE IN 50% (W/W) GLYCERIN

| | Percent Linear Swelling | | |
|---|---|---|---|
| Time (min.) | H | I | Ave % |
| 5 | 0.12 | 0.06 | 0.09 |
| 10 | 0.21 | 0.16 | 0.18 |
| 15 | 0.27 | 0.23 | 0.25 |
| 30 | 0.48 | 0.42 | 0.45 |
| 60 | 0.82 | 0.69 | 0.76 |
| 120 | 1.32 | 1.23 | 1.28 |

TABLE 10C
LINEAR SWELLING AND RELATIVE HARDNESS OF SODIUM BENTONITE IN 25% (W/W) GLYCERIN

| | Percent Linear Swelling | | |
|---|---|---|---|
| Time (min.) | J | K | Ave % |
| 5 | 0.12 | 0.26 | 0.19 |
| 10 | 0.35 | 0.55 | 0.45 |
| 15 | 0.55 | 0.76 | 0.66 |
| 30 | 1.1 | 1.29 | 1.20 |
| 60 | 1.94 | 2.01 | 1.98 |
| 120 | 3.02 | 2.90 | 2.96 |

TABLE 10C-continued
LINEAR SWELLING AND RELATIVE HARDNESS OF SODIUM BENTONITE IN 25% (W/W) GLYCERIN

| Time (min.) | Percent Linear Swelling | | |
|---|---|---|---|
| | J | K | Ave % |
| Hardness (mm) | 7.9 | 12.3 | |

TABLE 10D
LINEAR SWELLING AND RELATIVE HARDNESS OF SODIUM BENTONITE IN 50% (w/w) PROPYLENE GLYCOL

| Time (min.) | Percent Linear Swelling | | | |
|---|---|---|---|---|
| | L | M | N | Ave % |
| 5 | 0.05 | 0.07 | 0.05 | 0.06 |
| 10 | 0.12 | 0.17 | 0.10 | 0.13 |
| 15 | 0.17 | 0.24 | 0.16 | 0.19 |
| 30 | 0.33 | 0.51 | 0.35 | 0.40 |
| 60 | 0.68 | 1.1 | 0.78 | 0.85 |
| 120 | 1.43 | 1.95 | 1.44 | 1.61 |
| Hardness (mm) | 3.5 | 3.0 | 2.8 | |

TABLE 10E
LINEAR SWELLING AND RELATIVE HARDNESS OF SODIUM BENTONITE IN 50% (w/w) SORBITOL

| Time (min.) | Percent Linear Swelling | | | |
|---|---|---|---|---|
| | O | P | Q | Ave % |
| 5 | 0.06 | 0.07 | 0.05 | 0.06 |
| 10 | 0.11 | 0.13 | 0.11 | 0.12 |
| 15 | 0.17 | 0.19 | 0.16 | 0.17 |
| 30 | 0.32 | — | 0.28 | 0.30 |
| 60 | 0.64 | — | 0.46 | 0.55 |
| 120 | 1.1 | — | 0.83 | 0.96 |
| 15 HR | — | 3.09 | — | — |
| Hardness (mm) | 3.0 | 10.0 | 3.0 | |

TABLE 10F
LINEAR SWELLING AND RELATIVE HARDNESS OF SODIUM BENTONITE IN 50% (w/w) POLY-TERGENT S-305 LF

| Time (min.) | Percent Linear Swelling |
|---|---|
| | R |
| 10 | 0.22 |
| 20 | 0.35 |
| 30 | 0.44 |
| 40 | 0.57 |
| 50 | 0.65 |
| 60 | 0.73 |
| 90 | 0.94 |
| 120 | 1.12 |
| Hardness (mm) | 2.5 |

TABLE 10G
LINEAR SWELLING AND RELATIVE HARDNESS OF SODIUM BENTONITE IN 50% (w/w) POLYGLYCOL 15-200

| Time (min.) | Percent Linear Swelling |
|---|---|
| | S |
| 10 | 0.24 |
| 20 | 0.32 |
| 30 | 0.38 |
| 40 | 0.42 |
| 50 | 0.45 |
| 60 | 0.48 |
| 90 | 0.52 |
| 120 | 0.54 |
| Hardness (mm) | less than 0.5 |

EXAMPLE XI

The shale inhibition characteristics of the two component modified liquid phase drilling fluid of this invention (Mud A) were compared to those of an oil-base fluid (Mud B). Composition of the two fluids are given below:

| | | lb/bbl |
|---|---|---|
| Mud A | Water | 164.4 |
| (Two component modified liquid phase) | MILGEL ® (gelling agent) | 5 |
| | Tripropylene glycol bottoms | 164.4 |
| | MILBAR ® (barite) | 90 |
| | UNI-CAL ® (deflocculant) | 0.5 |
| Mud B | Oil (Low Viscosity Mineral Seal) | 147.8 |
| (Oil Mud) | 30% CaCl$_2$ solution | 124.5 |
| | Barite | 123 |
| | CARBO-MUL ® (invert emulsifier) | 1.9 |
| | CARBO-GEL ® (gelling agent) | 4.0 |

The flow characteristics at 120° F. of these two fluids after hot rolling at 150° F. for 16 hours are shown in Table 11A.

TABLE 11A

| | Mud A | Mud B |
|---|---|---|
| PV, cPs | 13 | 15 |
| YP, lb/100 ft$^2$ | 9 | 7 |
| I Gel, lb/100 ft$^2$ | 9 | 7 |
| 10 Min. Gel, lb/100 ft$^2$ | 15 | 9 |

The percent linear swelling of a sodium bentonite pellet exposed to the two component modified liquid phase drilling fluid and the oil based drilling fluid is shown in Table 11B. The procedure used to measure the linear swelling is described on pages 52–53, "Swelling Test" of paper entitled "Rigsite Shale Evaluation Techniques for control of Shale-related Wellbore Instability Problems", SPE/IADC Paper 16054 (1987).

TABLE 11B

| | Percent Linear Swelling in 60 Minutes |
|---|---|
| Mud A (2 component modified liquid phase) | −0.44 |
| Mud B (oil-based) | −0.23 |

As shown by the data, both fluids caused the sodium bentonite pellet to contract (decrease in length) indicating that moisture had been withdrawn from the pellet. In this case, dehydration of the two pellets occurred, which is characteristic of oil base fluids whose osmotic activity is controlled by the concentration of calcium chloride salt in the internal water phase.

The relative hardness of the sodium bentonite pellets at the end of the linear swelling test was determined using the penetrometer to measure the depth of penetration of a needle into the pellet. The results are given in Table 11C below:

TABLE 11C

| | Depth of Penetration, mm |
|---|---|
| Mud A (Two component modified liquid phase) | 0 |
| Mud B | 0.5 |

TABLE 11C-continued

| | Depth of Penetration, mm |
|---|---|
| (oil-based) | |

This data shows that the two component modified liquid phase drilling fluid preserves the integrity of the sodium bentonite pellet as does the oil base fluid.

The comparison shows that the two-component modified liquid phase drilling fluid is capable of stabilizing shale in a manner similar to that of an oil-based fluid.

EXAMPLE XII

In another example, two typical state-of-the-art water based laboratory prepared muds were compared to the two component modified liquid phase drilling fluid of this invention. Compositions of the three test fluids are given below:

| | | lb/bbl |
|---|---|---|
| Mud A | Water | 328.7 |
| (Lignosulfonate) | MILGEL ® (gelling agent) | 22.8 |
| | UNI-CAL ® (deflocculant) | 2.5 |
| | MIL-BAR ® (barite weighting agent) | 90.0 |
| | NaOH pH to 9.5 | |
| Mud B | Water | 328.7 |
| (PHPA Polymer) | NEW-DRILL HP | 1.0 |
| | MILGEL ® | 10 |
| | NEW-THIN (deflocculant) | 0.2 |
| | MIL-BAR | 90.0 |
| | NaOH pH to 9.5 | |
| Mud C | Water | 230.1 |
| (Two Component | MILGEL | 8.5 |
| Liquid Phase) | Tripropylene Glycol Bottoms | 98.6 |
| | MIL-BAR | 90.0 |
| | UNI-CAL ® | 0.75 |
| | XC Polymer (Xanthomonus campestris shear-thinning synthetic polymer) | 0.3 |

The flow properties of these fluids after hot rolling at 150° F. for 16 hours are as follows:

TABLE 12A

FLOW PROPERTIES
Fann 35 Rheology, 120° F.

| | 600 | 300 | 200 | 100 | 6 | 3 | 1G | 10G | pH | PV/YP |
|---|---|---|---|---|---|---|---|---|---|---|
| Mud A | 56 | 32 | 22 | 13 | 3 | 2.5 | 3 | 4 | 9.4 | 24/8 |
| Mud B | 24 | 16 | 12 | 9 | 5 | 5 | 8 | 21 | 9.4 | 8/8 |
| Mud C | 40 | 23 | 16 | 10 | 3 | 2.5 | 4 | 9 | 11.3 | 17/6 |

The percent linear swelling of a reconstituted "gumbo" shale test speciment determined as by procedure described on pages 52–53, "Swelling Test" of paper entitled "Rigsite Shale Evaluation Techniques for Control of Shale-related Wellbore Instability Problems", SPE/IADC Paper No. 16054 (1987 for the three drilling fluids is as follows:

TABLE 12B

| | % Linear Swelling in 60 minutes |
|---|---|
| Mud A | 5.0 (Avg.) |
| Mud B | 5.1 (Avg.) |
| Mud C | 3.8 (Avg.) |

Using the penetrometer, the hardness (or lack thereof) of the test specimens after the Swelling Test was determined. The depth of penetration of the needle into the speciment is an indication of the degree of hardness or softness of the specimen upon completion of the test. The lower the value, the more inhibitive the test fluid. In this example, the two component modified liquid phase system of said invention was appreciable more inhibitive.

TABLE 12C

| | Relative Hardness |
|---|---|
| | Penetration depth, mm |
| Mud A | 6.0 |
| Mud B | 6.0 |
| Mud C | 1.0 |

The lubricity coeffcient of the three muds were determined by the method previosuly described and is shown in Table 12D below:

TABLE 12D

| | Lubricity Coefficient |
|---|---|
| Mud A | .33 |
| Mud B | .31 |
| Mud C | .20 |

The data of this example show that a two component modified liquid phase drilling fluid (Mud C) exhibits flow properties similar to those of a lignosulfonate drilling fluid and a polymer drilling fluid and is superior as a shale inhibiting fluid and shows improved lubricity.

EXAMPLE XIII

The 96 hr. $LC_{50}$[1] for Mysidopsis Almyna of an 80:20 oil based drilling fluid in which a Mineral Seal Oil, Mentor-28, (Exxon Company) was used as the oil phase was found to be 50,000 ppm (5%) in the suspended particulate phase. The 96 hr $LC_{50}$ for Mysidopsis bahia on a laboratory-prepared lignosulfonate mud (Generic Mud No. 7) containing 17% tripropylene glycol bottoms was 160,000 ppm (16%) in the suspended particulate phase showing that the fluid of said invention is less toxic to mysid shrimp than oil base fluid.

[1] Following the procedure described in Duke, T.W., Parrish, P.R., Montgomery, R.M., Macauley, S.D., Macauley, J.M. and Caipe, G.M. "Acute Toxicity of Eight Laboratory Prepared Generic Drilling Fluids to Mysids (Mysidaysis Bahia)" 1984 EPA-600/3-84-067.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A method of inhibiting the swelling of shale in a modifed non-polluting liquid phase drilling fluid, comprising the steps of:
    (1) preparing a non-polluting modified liquid phase drilling fluid consisting essentially of (a) a water phase consisting of fresh water, seawater, brine, simulated brine, or mixtures thereof; (b) a water-soluble component which is tripropylene glycol bottoms having from between about 5% and about 20% by volume tripropylene glycol and from between about 95% and about 80%, by volume, polypropylene glycol highers, the ratio of said water-soluble component to the total liquid phase being from between about 5% to about 50% by volume; (c) a viscosifier for suspension of solids in said liquid phase; and (d) a filtration control agent, the linear swelling on a reconstituted "gumbo" shale inserted in said drilling fluid for about 60 minutes being lower than that for substantially the same fluid without the water soluble component, as measured by the "Swelling Test", Rigsite Shale Evaluation Techniques for Control of Shale-Related Wellbore Instability Problems, SPE/IADC Paper NO. 16054, pp. 52–53 (1987), said drilling fluid being less toxic to mysid shirimp than an 80:20 oil based drilling fluid containing a mineral seal oil as the oil phase following toxicity test procedures as set forth in "Acute Toxicity of Eight Laboratory Prepared Generic Drilling Fluids to Mysids (Mysidopsss Bahia)", 1984 EPA-600/3-84-067; and (2) circulating said drilling fluid into, through and out of said subterranean well whereby said drilling fluid contacts formation particulate matter and the bore of said well to thereby inhibit the swelling of the shale.

* * * * *